United States Patent [19]

Burns

[11] Patent Number: 4,705,280

[45] Date of Patent: Nov. 10, 1987

[54] FOLDABLE UTILITY CART WITH AUXILIARY SUPPORT CARRIAGE

[76] Inventor: Richard H. Burns, 662 Clarendon Rd., Troy, Ohio 45373

[21] Appl. No.: 924,863

[22] Filed: Oct. 29, 1986

Related U.S. Application Data

[63] Continuation-in-part of Ser. No. 788,323, Oct. 17, 1985, Pat. No. 4,624,467.

[51] Int. Cl.⁴ ............................................. B62B 1/12
[52] U.S. Cl. ..................................... 280/40; 280/655; 280/656; 280/767
[58] Field of Search ............... 280/656, 79.1 R, 47.16, 280/47.13 R, 40, 47.2, 651, 652, 655, 767, 656

[56] References Cited

U.S. PATENT DOCUMENTS

| | | | |
|---|---|---|---|
| 908,472 | 1/1909 | Lyons | 280/40 |
| 1,128,333 | 2/1915 | Krna | 280/40 |
| 2,469,506 | 5/1949 | Kerr et al. | 280/40 |
| 2,657,069 | 10/1953 | Quist | 280/40 |
| 2,767,996 | 10/1956 | Seyforth | 280/40 |
| 2,879,072 | 3/1959 | Rear et al. | 280/40 |
| 2,970,846 | 2/1961 | Boston | 280/40 |
| 3,879,053 | 4/1975 | Chvala | 280/79.1 R X |
| 4,253,677 | 3/1981 | Wissler | 280/40 |
| 4,529,220 | 7/1985 | Wright et al. | 280/656 |

OTHER PUBLICATIONS

Foldit Cart Sales Brochure, 2 pages, Undated.
Work Shops, Fall 1986, p. 6.

Primary Examiner—John J. Love
Assistant Examiner—Michael Mar
Attorney, Agent, or Firm—John R. Flanagan

[57] ABSTRACT

A foldable utility cart has a hauling body convertible between erected and folded conditions and tiltable between upright hauling and upturned nonhauling positions. Wheels are connected to the hauling body so as to engage the ground and movably support the body when in its erected condition and upright hauling position, but not support the body when in its folded condition and upturned nonhauling position. An auxiliary support carriage is connected to the hauling body and disposable at transport and stored positions respectively when the hauling body is tilted between its upturned nonhauling and upright hauling positions. When the carriage is disposed at its transport position, it is engaged with the ground so as to support the hauling body freestanding without operator assistance in its upturned nonhauling position out of contact with the ground thereby facilitating conversion of the hauling body between its erected and folded conditions and transport of the body to and from a storage location. When the carriage is disposed at its stored position, it is not engaged with the ground and does not support the hauling body.

12 Claims, 20 Drawing Figures

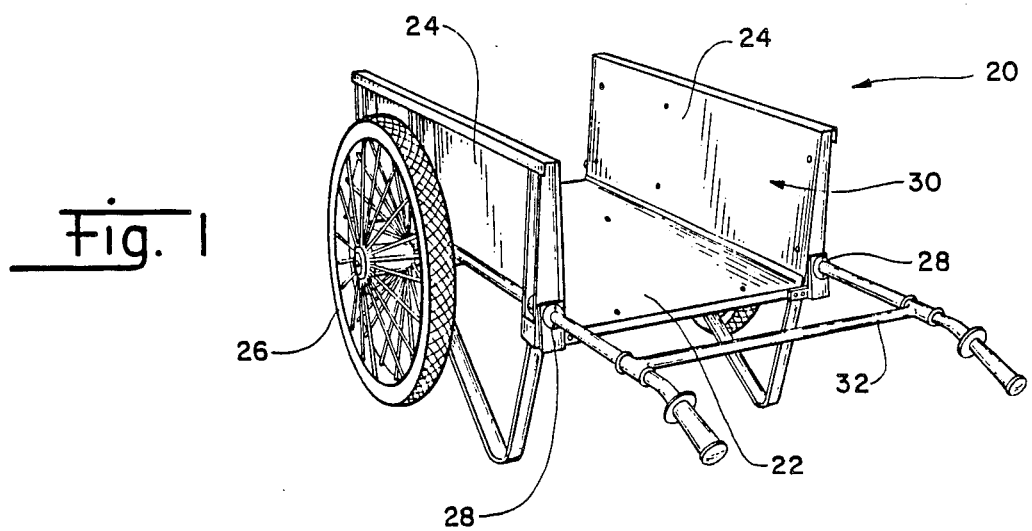
Fig. 1
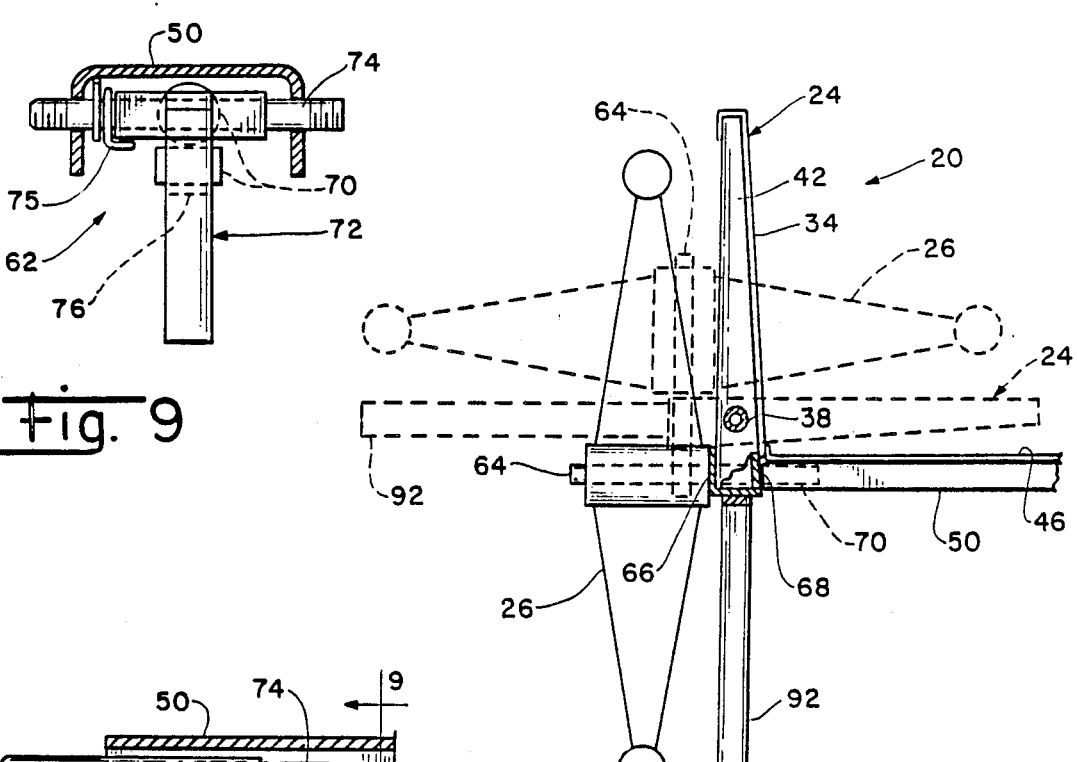
Fig. 9
Fig. 3
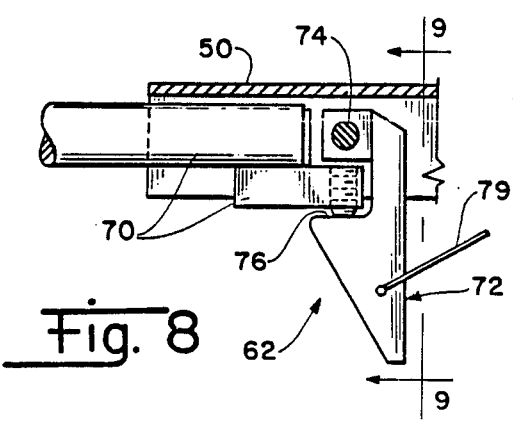
Fig. 8

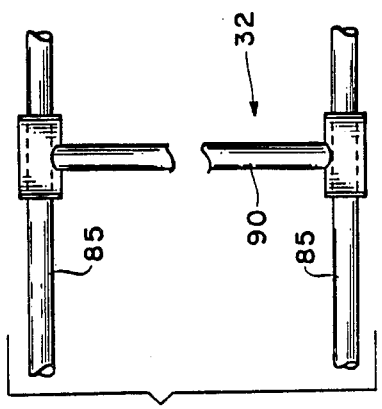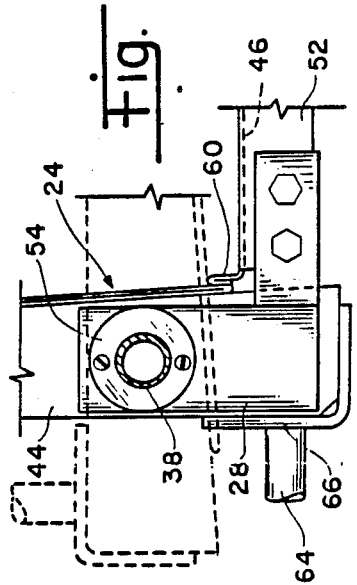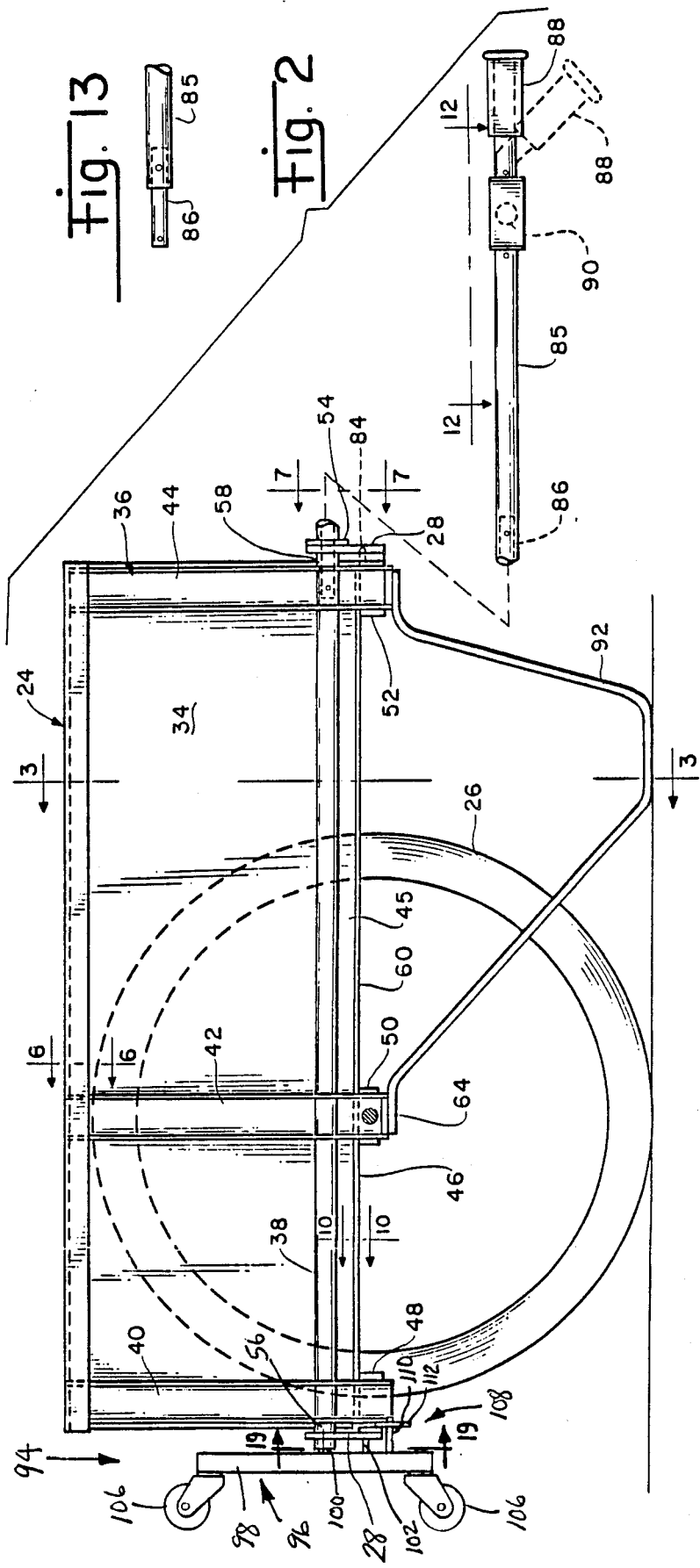

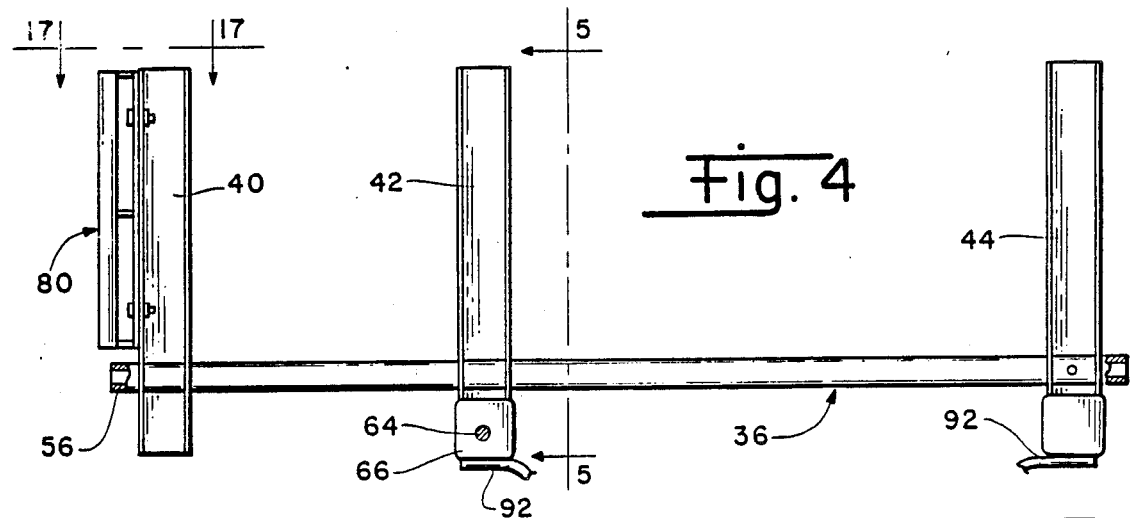
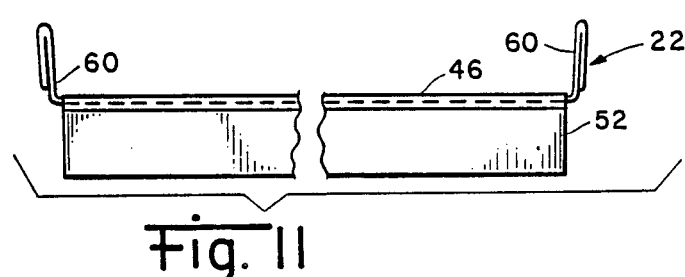
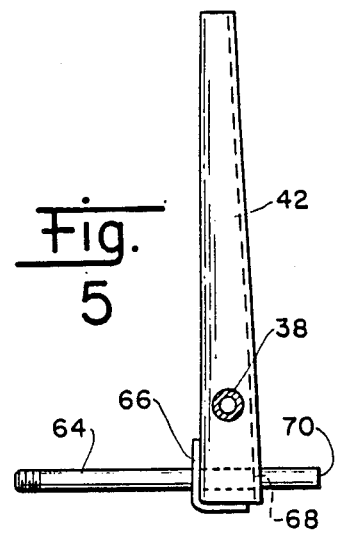
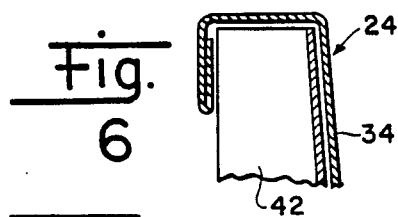
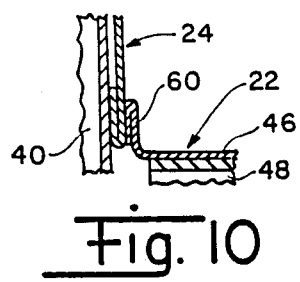
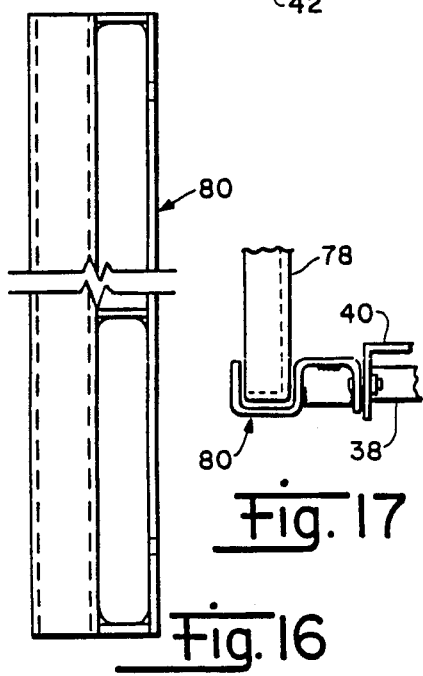
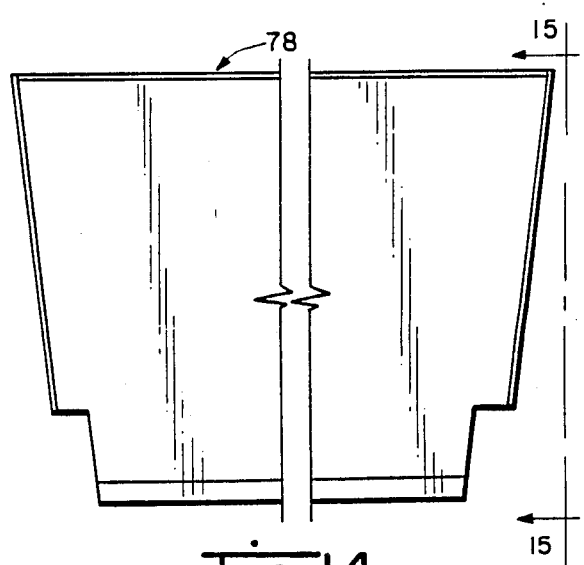
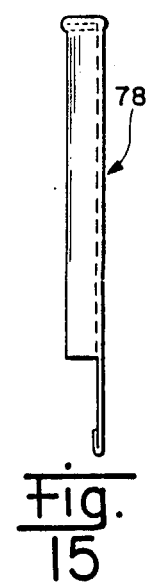

FOLDABLE UTILITY CART WITH AUXILIARY SUPPORT CARRIAGE

CROSS REFERENCE TO RELATED APPLICATION

This application is a continuation-in-part of my co-pending U.S. patent application Ser. No. 788,323, filed Oct. 17, 1985 and issued Nov. 25, 1986 as U.S. Pat. No. 4,624,467.

BACKGROUND OF THE INVENTION

1. Field of the Invention

The present invention generally relates to multi-purpose wheeled utility vehicles and, more particularly, is concerned with a utility cart having an auxiliary support carriage adapted to support the cart in a freestanding, upturned nonhauling position for facilitating conversion thereof between erected and folded conditions and transport of the upturned folded cart to and from a storage location.

2. Description of the Prior Art

Lawn and garden work and general maintenance activities of the average homeowner frequently requires the use of a multipurpose manually-powered utility vehicle for hauling a variety of things. Over the years the ordinary wheelbarrow, with its shallow flared box supported by a single front wheel and two back legs, has served this function well. However, in the past decade or so there has been a trend toward use of the utility cart, with its deeper rectangular box supported by a pair of side wheels and back legs, as a substitute for or at least a supplement to the wheelbarrow.

Notwithstanding this growing recognition of the two-wheeled utility cart's superiority over the wheelbarrow as the more versatile hauling vehicle, the same major drawback that has plagued the wheelbarrow for years has dampen the acceptability of the utility cart as a viable alternative to the wheelbarrow. That drawback is the substantial amount of space required by the cart for storage when not in use. Most of the storage space in residential garages and yard sheds is occupied already by higher priority items such as the automobile, lawn mower, snow blower, bicycle, tricycle, and lawn and garden tools. Therefore, the homeowner's decision of whether to purchase a utility cart might very likely hinge on whether enough storage space remains unused.

One approach to easing the homeowner's dilemma is to make the utility cart collapsible or foldable so that when not in use it can be stored in a smaller space. Many different collapsible or foldable carts, trailers or other types of wheeled vehicles appear in the prior art. Representative of the prior patent art are the two-wheeled vehicles disclosed in U.S. Pat. Nos. to Wissler (4,253,677), Rear et al (2,879,072), Kerr et al (2,469,506), Krna (1,128,333), Lyons (908,472), Boston (2,970,846), Seyforth (2,767,996) and Quist (2,657,069).

However, conversion of prior art carts between erected and folded conditions would appear to require the concurrent performance of a number of difficult and awkward steps, for instance, tilting and balancing the vehicle on edge unsupported by its wheels while attemping to fold or erect its various components. Also, prior art designs have not provided an effective way of reducing the user's burden in moving the folded vehicle to and from the storage location. Most designs assume that the user will carry the folded cart or slide it across the ground. For those users who either lack the strength to carry the cart or would prefer not to risk damage to the cart by sliding it, the prior art designs thus have major shortcomings.

Consequently, it is readily apparent that a need still exists for a readily foldable utility cart design wherein the folding and erecting of the cart and transporting of the folded cart to and from a storage location is simple and easy, requiring only the minimal amount of strength that would be possessed by a wide cross-section of users.

SUMMARY OF THE INVENTION

The present invention provides a foldable utility cart construction designed to satisfy the aforementioned needs. The utility cart of the present invention incorporates features which avoid the above-described shortcoming of the prior art carts. Unlike the awkward steps required to erect or fold, transport and store the prior art cart designs, conversion of the utility cart herein between erected and folded conditions and transport to and from storage are made relatively simple by an auxiliary support carriage employed by the cart which maintains the cart in a freestanding upturned nonhauling position during conversion and transport.

Accordingly, the present invention relates to a foldable utility cart which comprises the combination of: (a) a hauling body convertible between erected and folded conditions and tiltable between upright hauling and upturned nonhauling positions; (b) wheels connected to the hauling body so as to engage the ground and movably support the body when in its erected condition and upright hauling position but not support the body when in its folded condition and upturned nonhauling position; and (c) an auxiliary support carriage connected to the hauling body and disposable at transport and stored positions respectively when the hauling body is tilted between its upturned nonhauling and upright hauling positions, the carriage when disposed at its transport position being engaged with the ground and supporting the hauling body freestanding without operator assistance in its upturned nonhauling position out of contact with the ground thereby facilitating conversion of the hauling body between its erected and folded conditions and transport of the hauling body to and from a storage location, the carriage when disposed at its stored position being not engaged with the ground and not supporting the hauling body.

The auxiliary support carriage includes a pair of caster wheel assemblies removably mounted at one end of the hauling body adjacent respective opposite lateral sides thereof. Each of the caster wheel assemblies has a leg and a pair of rotatable caster wheels mounted in spaced relation along the leg. The laterally-spaced apart legs of the assemblies extend generally parallel to one another such that the caster wheels support the cart with its center of gravity within an imaginary boundary defined by the caster wheels.

More particularly, the hauling body includes a floor, a pair of opposite side panels and pivot means interconnecting and mounting the side panels to the floor for pivotal movement of each of the side panels relative to the floor between the erected condition in which the side panels together with the floor form a load supporting cavity and the folded condition in which the side panels overlie the floor so as to eliminate the cavity. The wheels are rotatably mounted to the respective side panels. The caster wheel assemblies of the auxiliary support carriage are mounted to the respective side panels and pivot means at the one end and lateral sides of the hauling body.

Still further, each of the side panels includes a wall member which wall members together with the floor define the load supporting cavity when the side panels are in their erected condition. Also, the each side panel has a longitudinal tube connected to and mount along each wall member of each side panel, the tube having a pair of opposite ends extending beyond the wall member and being rotatably mounted to the pivot means. Each pivot means is an extension member fixed at each opposite end of the floor along lateral sides thereof and rotatably mounting each of the respective longitudinal tubes at one of the opposite ends thereof. The caster wheel assemblies are removably mounted to the longitudinal tubes of the side panels in pivotal relation thereto and to the extension members of the side panels in stationary relation thereto at the one end of the hauling body. The leg of each caster wheel assembly has a mounting stud releasably matable with the end of the longitudinal tube at the one end of said hauling body and a locating pin releasably matable with the respective extension member at the one end of the hauling body. Also, each caster wheel assembly includes a retention mechanism on the leg for retaining the leg to the extension member with the stud and pin thereof mated respectively with the longitudinal tube end and the extension member.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which:

FIG. 1 is a perspective view of a foldable utility cart improved in accordance with the present invention.

FIG. 2 is an enlarged side elevational view of the improved cart of FIG. 1, with the left one of the wheels omitted for the purpose of clarity and the auxiliary support carriage being shown on the front end of the cart.

FIG. 3 is a fragmentary sectional view of the left half of the improved cart taken along line 3—3 of FIG. 2, illustrating pivotal conversion of the left side panel and wheel combination as a unit between an erected condition, being shown in solid line form, and a folded condition, being shown in broken line form, but, for purpose of clarity, without the latching mechanism for locking the side panel and wheel combination in the erected condition being shown at the inner end of the wheel axle below the cart floor.

FIG. 4 is a side elevational view of the left side panel support assembly of the improved cart of FIGS. 1 and 2 without the side sheet being shown, but showing an end gate support and guide channel attached to the front structural channel thereof.

FIG. 5 is an end elevational view of the middle structural channel of the left side panel support assembly seen along line 5—5 of FIG. 4 with the left wheel axle affixed to the lower end of the middle structural channel.

FIG. 6 is an enlarged fragmentary sectional view of the upper edge portion of the left side panel as taken along line 6—6 of FIG. 2.

FIG. 7 is an enlarged end elevational view as seen along line 7—7 of FIG. 2 of one of a pair of pivot defining extension plates with a bearing mounted thereto for pivotally supporting the each of the side panel support assemblies on the outer end corners of front and rear structural channels of the floor.

FIG. 8 is an enlarged fragmentary end elevational view of the latching mechanism which was omitted from FIG. 3, showing the latching mechanism locking the left wheel axle in its erected position under the middle structural channel of the floor.

FIG. 9 is a side elevational view of the latching mechanism as seen along line 9—9 of FIG. 8.

FIG. 10 is an enlarged fragmentary sectional view taken along 10—10 of FIG. 2, illustrating one of a pair of tight, substantially closed, corners formed between the respective lower longitudinal edges of the side panel sheets and the turned up longitudinal opposite side edge portions of the floor pan when the side panels are in their erected position.

FIG. 11 is a foreshortened end elevational view of the cart floor removed from the improved cart.

FIG. 12 is a fragmentary foreshortened top plan view of the cart handle assembly as seen along line 12—12 of FIG. 2.

FIG. 13 is a fragmentary side elevational view of one of a pair of forward ends of the handle assembly which are inserted into the rear ends of the respective longitudinal support assembly tubes of the cart side panels.

FIG. 14 is a side elevational view of one of a pair of end gates for closing the opposite ends of the improved cart of FIGS. 1 and 2.

FIG. 15 is an end elevational view of the end gate as seen along line 15—15 of FIG. 14.

FIG. 16 is an enlarged side elevational view of one of four end gate support and guide channels which attach to respective forward and rearward vertical ends of the respective front and rear structural channels of the cart side panels.

FIG. 17 is a top plan view of the end gate channel with end gate installed therein as seen along line 17—17 of FIG. 4.

DETAILED DESCRIPTION OF THE INVENTION

In the following description, right hand and left hand references are determined by standing at the rear of the cart behind the handle in FIG. 1 and facing toward the cart. Also, in the following description, it is to be understood that such terms as "forward," "left," "upwardly," etc., are words of convenience and are not to be construed as limiting terms.

Figure 18:
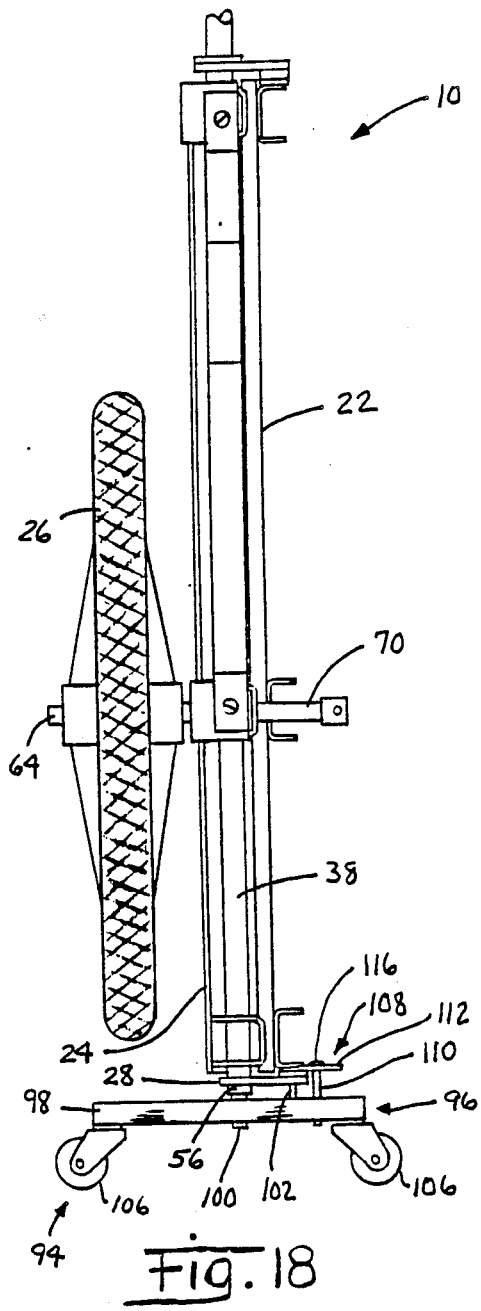
FIG. 18 is an end elevational view of the improved cart of FIGS. 1 and 2 after conversion to its folded condition while supported in a freestanding upturned nonhauling position by the auxiliary support carriage.

Referring now to the drawings, and particularly to FIGS. 1 and 2, there is shown the preferred embodiment of an improved foldable utility cart, generally designated by the numeral 20 and constructed in accordance with the principles of the present invention. The improved foldable utility cart basically includes a floor 22 and a pair of opposite wheel-bearing side panels 24 forming a hauling body. A pair of ground engagable wheels 26 are rotatably mounted to the side panels 24 for mobilizing the hauling body. A plurality of pivot means 28 disposed at respective opposite ends of the floor 22 and of the side panels 24 interconnect and mount each side panel and wheel combination as a unit to the floor 22 for pivotal movement relative to the floor 22 between an erected condition and a folded condition, as seen in respective solid and dashed line form in FIG. 3. In the erected condition of the wheel-bearing side panels 24 as seen in FIGS. 1 and 2, the floor 22 and side panels 24 together form a load supporting cavity 30 in the hauling body and the body is mobilized. On the other hand, in the folded condition of the wheel-bearing side panels 24 as seen in FIG. 18, the side panels 24 and wheels 26 overlie the floor 22 so as to eliminate the load supporting cavity 30 and immobilize the hauling body. Both the pivot means 28 and the wheels 26 are located outside of the load supporting cavity 30 of the cart 20. Also, the cart 20 has a handle assembly 32 attached to the side panels 24 for adapting the cart for manually-powered pushing or pulling type of locomotion when the side panels 24 and wheels 26 are in the erected condition and the hauling body in an upright hauling position.

Referring also to FIGS. 3 to 7, in addition to FIGS. 1 and 2, it is seen that each of the side panels 24 of the improved cart 20 is composed of a wall member 34 in the form of a generally rectangular sheet of metal and a structural support assembly 36 reinforcing the wall member 34 on its exterior side so as to maintain it in a flat rigid condition. As seen in FIGS. 2, 6 and 10, also the peripheral edges of the wall member 34 are folded over so as to provide additional rigidity to the member. The structural support assembly 36 includes a longitudinally extending hollow pipe or tube 38 which defines the pivotal axis of the side panel 24 and has spaced apart front, middle and rear structural channels 40,42,44 which are rigidly connected, such as by being welded, to the tube 38 and extend in transverse relation to the tube and generally parallel to one another. The tube 38 extends along the exterior of the wall member 34 just above its lower longitudinal edge 45 and through the channels 40,42,44, which at their lower ends extend below the tube 38.

The floor 22 of the cart 20 is similarly composed of a generally rectangular sheet of metal or floor pan 46 reinformed on its lower side to maintain a flat rigid condition by a series of spaced apart front, rear and middle transverse structural channels 48,50,52 which are generally aligned with the respective channels 40,42,44 of each of the side panels 24. As seen in FIG. 11, the peripheral edge portions of the floor pan 46 are also folded over so as to provide additional rigidity to the pan.

Each of the plurality of pivot means 28 which mount each side panel and wheel combination as a unit to the floor 22 for pivotal movement relative to the floor 22 is in the form of a flat extension plate 28 rigidly affixed to the outer end corners of the front and rear floor structural channels 48,52. The plates 28 mount respective bearings 54 which rotatably support the opposite front and rear ends 56,58 of the respective side panel tubes 38 outside of the load supporting cavity 30 of the cart 20. Specifically, the pivot defining extension plates 28 extend outward beyond the opposite ends of the front and rear floor channels 48,52 and overlap with the lower ends of the respective front and rear side panel channels 40,44 where they receive the opposite ends 56,58 of the tubes 38.

The respective wall members 34 of the side panels 24 at their interior sides face one another and together with the floor pan 46 define the load supporting cavity 30 when the side panels 24 are in their erected condition. Also, as seen in FIGS. 10 and 11, the floor pan 46 has upturned opposite side edges 60 which fit snugly along and in contact with the interior sides of the side panel wall members 34 at their lower longitudinal edges 45 when the side panels are in their erected condition so as to define generally closed longitudinal corners in the load supporting cavity 30. In view of the pivotal mounting of the side panels 24 at the opposite ends 56,58 of their tubes 38 by pairs of pivot extension plates 28 located outside of the cavity 30, there is nothing to obstruct the snug fit at the longitudinal corners between the floor pan 46 and the side panel wall members 34. Therefore, such unique pivot arrangement by which the side panels 24 and wheels 26 as a unit can pivot about the side edges of the floor 22 allows a tight seal or interface, as seen in FIG. 10, to be formed at the lower side corners when the side panels 24 are in their erected condition relative to the floor 22. Then, once the side panels 24 and wheels 26 have been pivoted as a unit toward their folded condition, the side panel wall member lower edges 45 are located away from the floor opposite side edges 60 which provides access for cleaning and drying of all of the edges 45,60.

Turning also to FIGS. 8 and 9, the side panel 24 and wheels 26 are retained in their respective erected condition by latching means in the form of a pair of releasable latching mechanisms 62 (only one being shown in FIG. 8) disposed outside of the load supporting cavity 30 of the hauling body and below the floor 22 thereof. Each latching mechanism 62 is actuatable between unlatching and latching positions (only the latching position being seen in FIG. 8), and preferably spring loaded for providing relatively automatic latching operation. Each latching mechanism 62 is mounted to the outer opposite ends of the middle floor channel 50 and disposed adjacent one of the ground wheels 26 (for sake of clarity the mechanism is not shown in FIG. 3).

Each of the ground wheels 26 is rotatably mounted by an axle 64 which extends through and is fixed to outer and inner plate portions 66,68 of the respective lower ends of the side panel middle channels 42. Thus, the common rotational axis of the wheels 26 when the side panels 24 are erected extends across and below the cart floor 22. The latching mechanisms 62 are mounted in the middle floor channel 50 to securely couple an extension 70 of each wheel axle 64 which underlies the floor 22 to the floor channel 50 so as to lock the side panels 24 and wheels 26 therewith in their erected condition with the wheel axles 64 aligned along the common axis. The extension 70 of each wheel axle 64 reduces the moment about pivot tube 38 and thereby reduces the load on the latching mechanism 62.

More particularly, each of the latching mechanisms 62 includes a latch member 72 rotatably mounted by a shaft 74 which extends between the sides of the middle floor channel 50. The shaft 74 at one end carries a spring 75 which automatically moves the member 72 to its latching position. Thus, a lower end 76 of the latch member 72 is spring biased toward the latching position, seen in FIG. 8, in which the axle extension 70 is seated in a notch 78 defined in the latch member 72. A separate flexible member, such a braided wire 79, interconnects each latch member 72 to the middle floor channel 50 so as to stop the spring biased member 72 at its latching position of FIG. 8. By pulling on the wire 79, the latch member 72 can be manually pivoted to an unlatching position (not shown) which moves its lower end 76 counterclockwise so as to disengage the axle extension 70 from the notch 76 in the latch member 72.

Once the side panels 24 and wheels 26 are pivoted relative to the floor 22 from their folded condition to their erected operative condition and latched (or locked) in the erected condition, a pair of end gates, one of which is seen in FIG. 14 and 15, can be mounted to the side panels 24 at opposite ends of the load supporting cavity 30 for closing the ends of the cavity. Particularly, an end gate support and guide channel 80, seen in FIGS. 16 and 17, can be mounted to the front and rear sides of the respective front and rear side panel channels 40,44 (one being shown on the front channel in FIG. 4) above the location of the pivotal extension plates 28. As seen in fragmentary form in FIG. 17, an end gate 78 can then be inserted into and between each pair of the guides channels 80 to a resting position on the front and rear edges 82,84 of the floor pan 46 which extend beyond the wall members 34 of the side panels 24, as seen in FIG. 2.

Turning to FIGS. 12 and 13, in addition to FIGS. 1 and 2, it is seen that the handle assembly 32 of the improved cart 20 has a pair of tubular members 85 with terminal ends 86 adapted to insert within and attached to the rear ends 58 of the side panel tubes 38. The tubular members 85 also have respective bent hand grip ends 88 opposite their terminal ends 86 and are rotatably interconnected by a cross member 90. Upon rotation of the pivot tubes 38 and side panels 24, the bent hand grip ends 88 are automatically converted between storage orientations, shown in solid line form in FIG. 2, in which the bent ends 88 extend in a common plane and operational orientations, seen in dashed line form in FIG. 2, in which the bent ends 33 extend in generally parallel planes.

To make the improved cart 20 freestanding in its erected operating condition and upright hauling position, a pair of generally U-shaped ground support brackets 92 are fixed to the lower ends of the front and middle side panel channels 40,42 so as to contact the ground with a large footprint rearwardly of the wheels 26. In view that the brackets 92 are fixed to the side panels 24, they pivot with the side panels along with the ground wheels 26.

Finally, as seen in FIGS. 2 and 18, an auxiliary support carriage, generally designated as 94, is provided on the front end of the cart 20 to facilitate conversion of the cart between its erected and folded conditions and transport the folded cart to and from a storage location, such as a shed or garage of the user. The hauling body of the cart 20, being composed of the floor 22 and the side panels 24 having the wheels 26 rotatably mounted thereon, is not only convertible between erected and folded conditions but also is tiltable between upright hauling (FIGS. 1 and 2) and upturned nonhauling (FIG. 18) positions. The wheels 26 are so located along the side panels 24 of hauling body that they will engage the ground and movably support the cart 20 when in its erected condition and upright hauling position but not support the cart when in its folded condition and upturned nonhauling position.

The auxiliary support carriage 94 includes a pair of caster wheel assemblies 96 (only the left one of the pair being seen in FIGS. 2 and 18) removably mounted at the front end of the cart 20 and, specifically, to the front extension plates 28 and front ends 56 of the extension tubes 38, adjacent respective opposite lateral sides of the cart and adjacent to and outwardly of the guide channels 80 which receive the end gate 78. Since the caster wheel assemblies 96 are identical, illustration and description of only one assembly will be sufficient.

Figure 20:
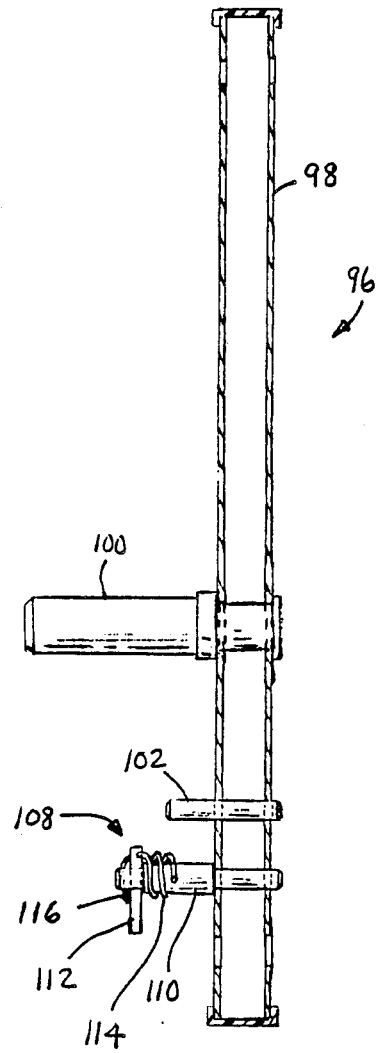
FIG. 20 is an enlarged side elevational view of one of the caster wheel assemblies of the auxiliary support carriage with its caster arm being shown longitudinally sectioned.
Figure 19:
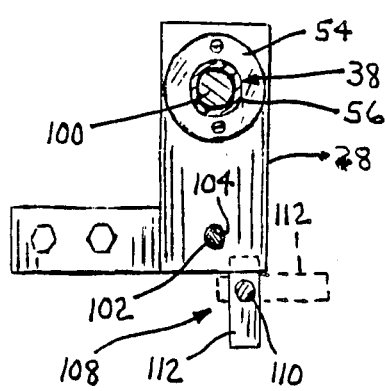
FIG. 19 is an enlarged end elevational as seen along line 19—19 of FIG. 2 of one of the pair of front pivot defining extension plates which mount the auxiliary support carriage as well as the front ends of the side panel support assemblies.

Referring now to FIGS. 19 and 20, as well as FIG. 18, each of the caster wheel assemblies 96 includes an elongated leg 98 having a mounting stud 100 fastened thereto and extending in transverse relation outwardly therefrom. The mounting stud 100 is releasably matable with the end 56 of the tube 38 located at the front end of the cart 20. Also, each assembly 96 has a locating pin 102 attached thereto in spaced relation to the mounting stud 100. The locating pin 102 extends in transverse relation to and outwardly from the leg 98 and is releasably matable within a hole 104 defined in the respective extension plate 28 at the front end of the cart. The locating pin 102 prevents the leg 98 from rotating relative to the respective extension plate 28. Thus, the caster wheel assemblies 96 are removably mounted to the tubes 38 of side panels in pivotal relation thereto and to the extension plates in stationary relation thereto. Such mounting of the caster wheel assemblies 96 in stationary relation to the extension plates 28 and in pivotal relation to the extension tubes 38 of the side panels 24 maintains the caster wheel assemblies 96 in a stationary relation to one another irrespective of whether the side panels 24 are disposed in their erected or folded conditions relative to the floor 22.

Furthermore, each of the caster wheel assemblies 96 have a pair of rotatable caster wheels 106 mounted in spaced relation along the assembly leg 98. The wheels 106 extend from the leg 98 in a direction opposite to that of the mounting stud 100 and locating pin 102. When the assemblies 96 are installed on the front end of the cart 20, their laterally-spaced apart legs 98 extend generally parallel to one another such that their caster wheels 106 support the cart with its center of gravity within an imaginary boundary defined by the caster wheels.

Finally, each caster wheel assembly 96 also includes a mechanism 108 on the leg 98 for retaining the leg to the extension plate 28 with the mounting stud 100 and locating pin 102 mated respectively with the tube end 56 and the extension plate hole 104. Specifically, the retention mechanism 108 is a stud 110 attached on the leg 98 adjacent the pin 102 and having a retaining lever 112 rotatably mounted on the outer end thereof by a torsional spring 114 on one side and an end cap 116 on the other. Rotation of the lever 112 by the operator from its solid line retaining position to dashed line releasing position, as seen in FIG. 19, allows removal of the assembly 96 from the cart 20. Due to the return force of the torsional spring 114, upon release by the operator the lever 112 will return to and normally stay at its vertically-extending retaining position.

Thus, when the cart 20 is in its upright hauling position of FIG. 2, the assemblies 96 are disposed at stored positions. On the other hand, when the cart 20 is tilted to its upturned nonhauling position of FIG. 18, the assemblies 96 are disposed at transport positions. More particularly, when the assemblies 96 are disposed at their transport positions (FIG. 18), they engage the ground and support the cart, whether in erected or folded conditions, in freestanding relation without operator assistance in its upturned nonhauling position out of contact with the ground. In such position, the cart is readily converted between its erected and folded conditions and transported to and from a storage location. On the other hand, when the assemblies 96 are disposed at their stored positions (FIG. 2), they do not engage the ground and thus do not support the cart. Optionally, it should be realized that the caster wheel assemblies 96 can be removed from the cart 20 when the cart is being used in its upright hauling position. However, usually the assemblies are retained on the cart 10 during all normal uses of the cart.

It is thought that the improved foldable utility cart of the present invention and many of its attendant advantages will be understood from the foregoing description and it will be apparent that various changes may be made in the form, construction and arrangement of the parts thereof without departing from the spirit and scope of the invention or sacrificing all of its material advantages, the form hereinbefore described being merely a preferred or exemplary embodiment thereof.

I claim:

1. In a foldable utility cart, the combination comprising:
   (a) a hauling body including a floor having a pair of opposite lateral sides, a pair of opposite side panels and pivot means interconnecting and mounting said side panels to said floor at said respective opposite lateral sides thereof for pivotal movement of each of said side panels relative to said floor between an erected condition in which said side panels together with said floor form a load supporting cavity and a folded condition in which said side panels overlie said floor so as to eliminate said cavity, said hauling body being tiltable between upright hauling and upturned nonhauling positions irrespective of whether said side panels are disposed in their erected or folded conditions relative to said floor;
   (b) wheels connected to said side panels of said hauling body so as to engage the ground and movably support said body when said side panels thereof are in their erected condition and said hauling body is in its upright hauling position, said wheels assuming a nonsupporting relationship with respect to the ground and said hauling body when said side panels are in their folded condition and said hauling body is in its upturned nonhauling position; and
   (c) an auxiliary support carriage including a pair of wheel assemblies being mounted to said pivot means in stationary relation thereto and to side panels in pivotal relation thereto to allow said side panels to pivot relative to said wheel assemblies between their erected and folded conditions, said wheel assemblies being disposable at transport and stored positions respectively when said hauling body is tilted between its upturned nonhauling and upright hauling positions, said wheel assemblies when disposed at their transport position being engaged with the ground and supporting said hauling body freestanding without operator assistance in its upturned nonhauling position out of contact with the ground thereby facilitating conversion of said side panels of said hauling body between their erected and folded conditions and transport of said hauling body to and from a storage location, said wheel assemblies when disposed at their stored position being placed in a nonengaged relationship with the ground and a nonsupporting relationship with said hauling body, said mounting of said wheel assemblies in stationary relation to said pivot means and in pivotal relation to said side panels maintaining said wheel assemblies in a stationary relation to one another irrespective of whether said side panels are disposed in their erected or folded conditions relative to said floor.

2. The utility cart as recited in claim 1, wherein said wheel assemblies are removably mounted to said respective side panels and pivot means at said one end of said hauling body adjacent said respective opposite lateral sides thereof.

3. The utility cart as recited in claim 2, wherein each of said wheel assemblies has a leg and a pair of rotatable wheels mounted in spaced relation along said leg, said laterally-spaced apart legs of said assemblies extending generally parallel to one another such that said wheels support said cart with its center of gravity within an imaginary boundary defined by said wheels.

4. The utility cart as recited in claim 1, wherein each of said side panels includes:
   a wall member, said wall members of said side panels together with said floor defining said load supporting cavity when said side panels are in their erected condition; and
   a longitudinal tube connected to and mounted along said wall member of each side panel, said tube having a pair of opposite ends extending beyond said wall member and being rotatably mounted to said pivot means.

5. The utility cart as recited in claim 4, wherein each said pivot means is an extension member fixed at each opposite end of said floor along lateral sides thereof and rotatably mounting each of said respective longitudinal tubes at one of said opposite ends thereof.

6. The utility cart as recited in claim 5, wherein said auxiliary support carriage is removably mounted to said ends of said longitudinal tubes and said extension members at said one end of said hauling body adjacent said respective opposite lateral sides thereof.

7. The utility cart as recited in claim 6, wherein said wheel assemblies are caster wheel assemblies removably mounted to said ends of said longitudinal tubes in pivotal relation thereto and to said extension members in stationary relation thereto at said one end of said hauling body.

8. The utility cart as recited in claim 7, wherein each of said caster wheel assemblies includes a leg and a pair of rotatable caster wheels mounted in spaced relation along said leg, said laterally-spaced apart legs of said assemblies extending generally parallel to one another such that said caster wheels support said cart with its center of gravity within an imaginary boundary defined by said caster wheels.

9. The utility cart as recited in claim 7, wherein each of said caster wheel assemblies includes a leg having a mounting stud releasably matable with said end of said longitudinal tube at said one end of said hauling body and a locating pin releasably matable with said respective extension member at said one end of said hauling body.

10. The utility cart as recited in claim 9, wherein each of said caster wheel assemblies also includes a mechanism on said leg for retaining said leg to said extension member with said stub and pin thereof mated respectively with said longitudinal tube end and said extension member.

11. In a foldable utility cart, the combination comprising:
  (a) a hauling body including a floor having a pair of opposite lateral sides and a pair of opposite ends, a pair of opposite side panels and pivot means interconnecting and mounting said side panels to said floor at said respective opposite lateral sides thereof for pivotal movement of each of said side panels relative to said floor between an erected condition in which said side panels together with said floor form a load supporting cavity and an folded condition in which said side panels overlie said floor so as to eliminate said cavity, said hauling body being tiltable between upright hauling and upturned nonhauling positions irrespective of whether said side panels are disposed in their erected or folded conditions relative to said floor;
  (b) wheels connected to said side panels of said hauling body so as to engage the ground and movably support said body when said side panels thereof are in their erected condition and said hauling body is in its upright hauling position, said wheels assuming a nonsupporting relationship with respect to the ground and said hauling body when said side panels are in their folded condition and said hauling body is in its upturned nonhauling position; and
  (c) an auxiliary support carriage including a pair of caster wheel assemblies being mounted to said side panels and said pivot means and being disposable at transport and stored positions respectively when said hauling body is tilted between its upturned nonhauling and upright hauling positions, said caster wheel assemblies of said carriage when disposed at their transport position being engaged with the ground and supporting said hauling body freestanding without operator assistance in its upturned nonhauling position out of contact with the ground thereby facilitating conversion of said side panels of said hauling body between their erected and folded conditions and transport of said hauling body to and from a storage location, said caster wheel assemblies of said carriage when disposed at their stored position being placed in nonengaged relationship with the ground and nonsupporting relationship with said hauling body;
  (d) each of said side panels including a wall member, said wall members of said side panels together with said floor defining said load supporting cavity when said side panels are in their erected condition, and a longitudinal tube connected to and mount along said wall member of each side panel, said tube having a pair of opposite ends extending beyond said wall member and being rotatably mounted to said pivot means;
  (e) each of said pivot means being an extension member fixed at each said opposite end of said floor along said lateral sides thereof and rotatably mounting each of said respective longitudinal tubes at one of said opposite ends thereof;
  (f) said respective caster wheel assemblies of said auxiliary support carriage being removably mounted to said ends of said longitudinal tubes in pivotal relation thereto and to said extension members in stationary relation thereto at said one end of said hauling body adjacent said respective opposite lateral sides thereof;
  (g) each of said caster wheel assemblies including a leg having a mounting stud releasably matable with said end of said longitudinal tube at said one end of said hauling body and a locating pin releasably matable with said respective extension member at said one end of said hauling body.

12. The utility cart as recited in claim 11, wherein each of said caster wheel assemblies also includes a mechanism on said leg for retaining said leg to said extension member with said stub and pin thereof mated respectively with said longitudinal tube end and said extension member.

* * * * *